Jan. 15, 1952

L. KERIAN 2,582,545

PORTABLE SORTING MACHINE

Filed April 26, 1948

Louis Kerian
INVENTOR.

Louis Kerian
INVENTOR.

Jan. 15, 1952 L. KERIAN 2,582,545
PORTABLE SORTING MACHINE
Filed April 26, 1948 6 Sheets-Sheet 3

Louis Kerian
INVENTOR.

BY
*Clarence A. O'Brien
and Harvey B. Jacobson*
Attorneys

Jan. 15, 1952 L. KERIAN 2,582,545
PORTABLE SORTING MACHINE
Filed April 26, 1948 6 Sheets-Sheet 4

Louis Kerian
INVENTOR.

BY *Clarence A. O'Brien*
*and Harvey B. Jacobson*
Attorneys

Jan. 15, 1952 L. KERIAN 2,582,545
PORTABLE SORTING MACHINE
Filed April 26, 1948 6 Sheets-Sheet 5

Louis Kerian
*INVENTOR.*

Jan. 15, 1952  L. KERIAN  2,582,545
PORTABLE SORTING MACHINE
Filed April 26, 1948  6 Sheets-Sheet 6
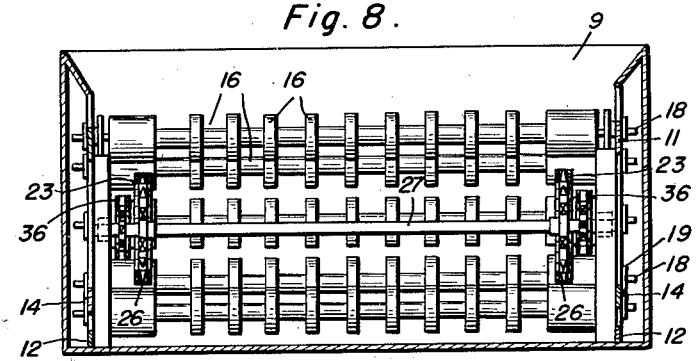
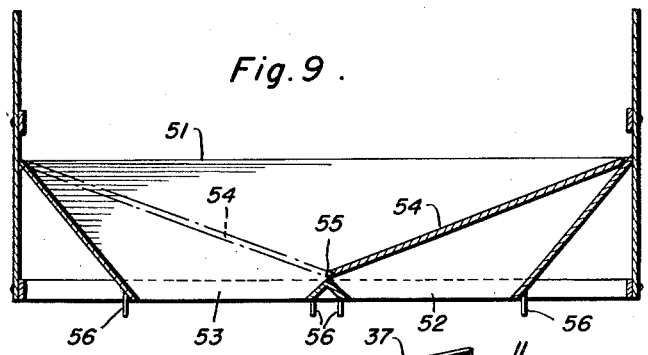
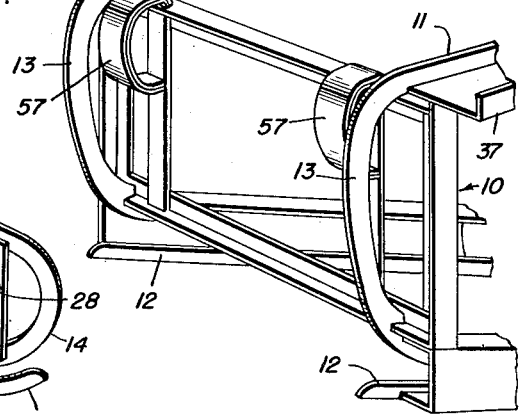
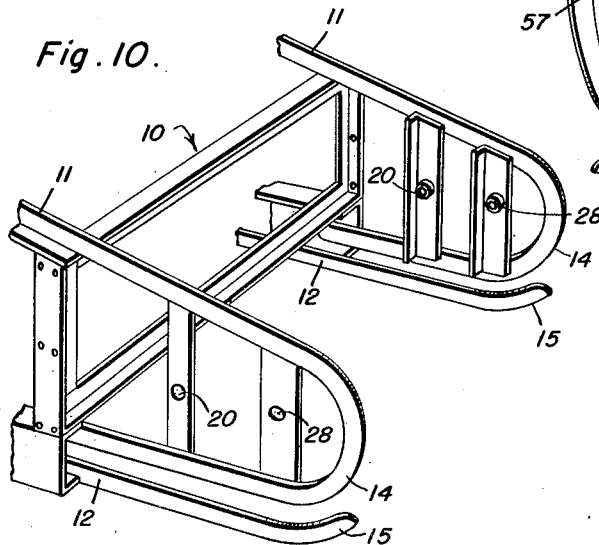
Louis Kerian
INVENTOR.

Patented Jan. 15, 1952

2,582,545

UNITED STATES PATENT OFFICE 2,582,545

PORTABLE SORTING MACHINE

Louis Kerian, Grafton, N. Dak.

Application April 26, 1948, Serial No. 23,302

3 Claims. (Cl. 209—106)

1

This invention relates to machines for sorting objects, such as fruits and vegetables, as to size, and has more particular reference to such a machine which is portable and in the nature of a two-wheeled trailer adapted to be moved from bin to bin in warehouses, or from place to place for sorting fruits, vegetables or the like in the field as they are harvested.

The primary object of the present invention is to provide a portable machine of the above kind which is highly efficient in operation and which is so designed and constructed as to meet the requirements for successful commercial use.

Generally described, the machine comprises an endless conveyor mounted near the rear thereof upon a transverse axle having coaxial ground-engaging wheels, and having a rigid front draft tongue adapted to be supported on and connected to the drawbar of a tractor. The conveyor includes an endless conveying and sorting element comprising a series of transverse horizontal rollers flexibly connected for limited movement toward and away from each other. The conveyor also has a horizontal upper rear portion and a forwardly inclined upper forward portion, and means are provided to compact the rollers into conveying relation as they pass to the front end of the conveyor, and to carry the rollers in such compacted conveying relation upwardly and rearwardly at the inclined upper forward portion to the upper rear portion. At the upper rear portion, means is provided to gradually increase the spacing of the rollers for performing the sorting operation.

A further object is to provide friction means to engage the rollers at the rear upper portion of the conveyor so as to cause said rollers to turn forwardly or in opposition to their direction of travel and thereby effectively cause the fruits or vegetables to pass downwardly through the spaces between adjacent rollers as soon as such spaces equal the diameter of the fruits or vegetables.

Another object is to provide means to turn the rollers in their direction of travel as they pass downwardly at the rear of the conveyor, so as to cause the largest fruits or vegetables still remaining on the rollers to be discharged rearwardly from the latter.

Still another object is to provide a pair of spaced endless carrier elements movable to carry the rollers upwardly and rearwardly in compacted conveying relation at the inclined upper forward portion of the conveyor, said carrier elements including endless chains having fingers arranged to engage behind the rollers, and bails connecting spaced transversely aligned pairs of the fingers and arranged to project above the rollers to aid the latter in conveying the fruits and vegetables rearwardly and upwardly to the horizontal upper rear conveyor portion.

The exact nature of the present invention, as well as other objects and features thereof, will become apparent from the following description when considered in connection with the accompanying drawings, in which:

Figure 7 is a fragmentary longitudinal section taken on line 7—7 of Figure 4;

Figure 8 is a transverse section taken on line 8—8 of Figure 2;

Figure 9 is a transverse section taken on line 9—9 of Figure 3;

Figure 10 is a fragmentary perspective view of the front portion of the conveyor frame;

Figure 11 is a fragmentary perspective view of the rear portion of the conveyor frame; and Figure 12 is a fragmentary perspective view showing a portion of the carrier means which carries the rollers rearwardly and upwardly in compacted conveying relation at the inclined upper forward portion of the conveyor.

Figure 1:
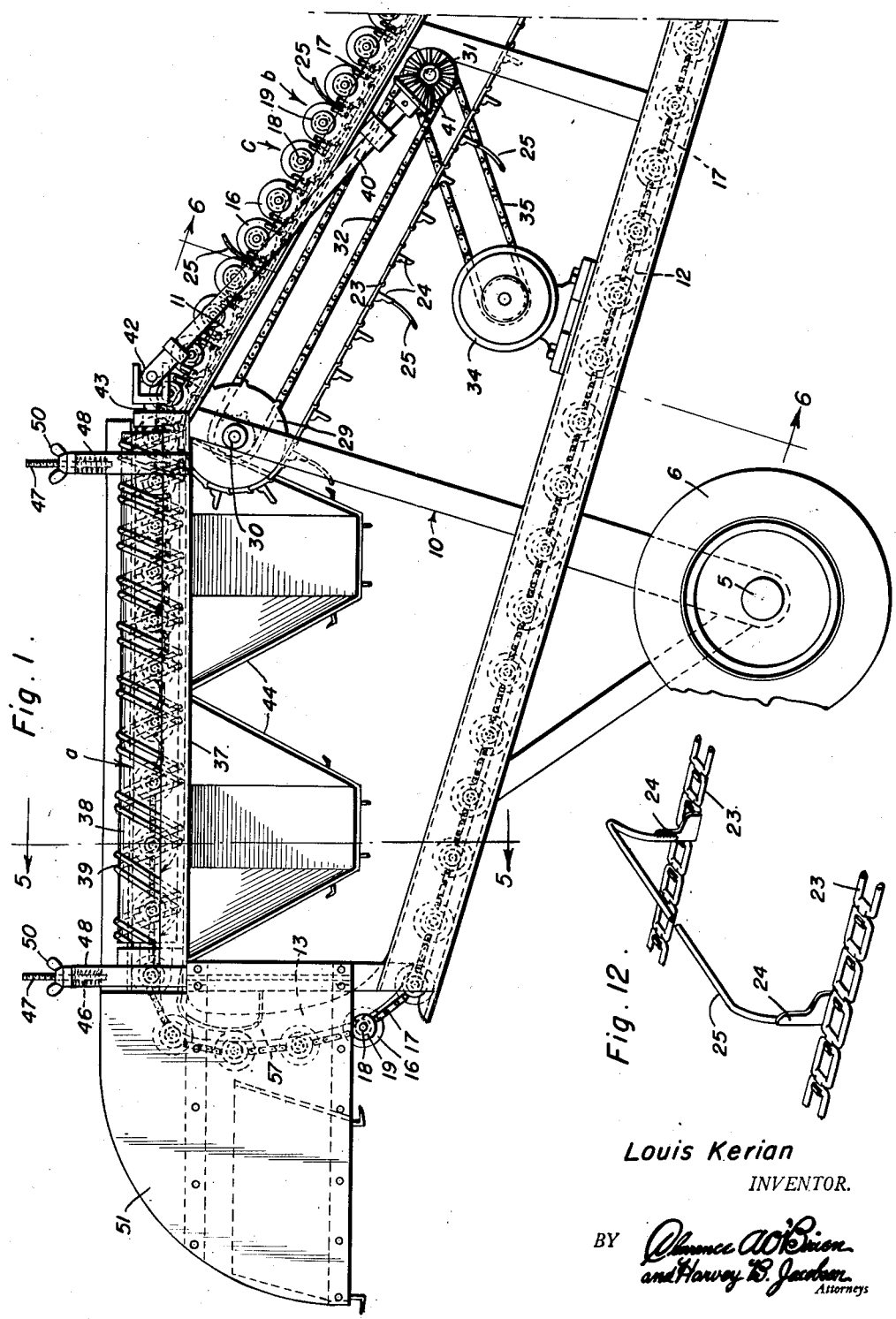
Figure 1 is a side elevational view of the rear portion of a sorting machine embodying the present invention.
Figure 2:
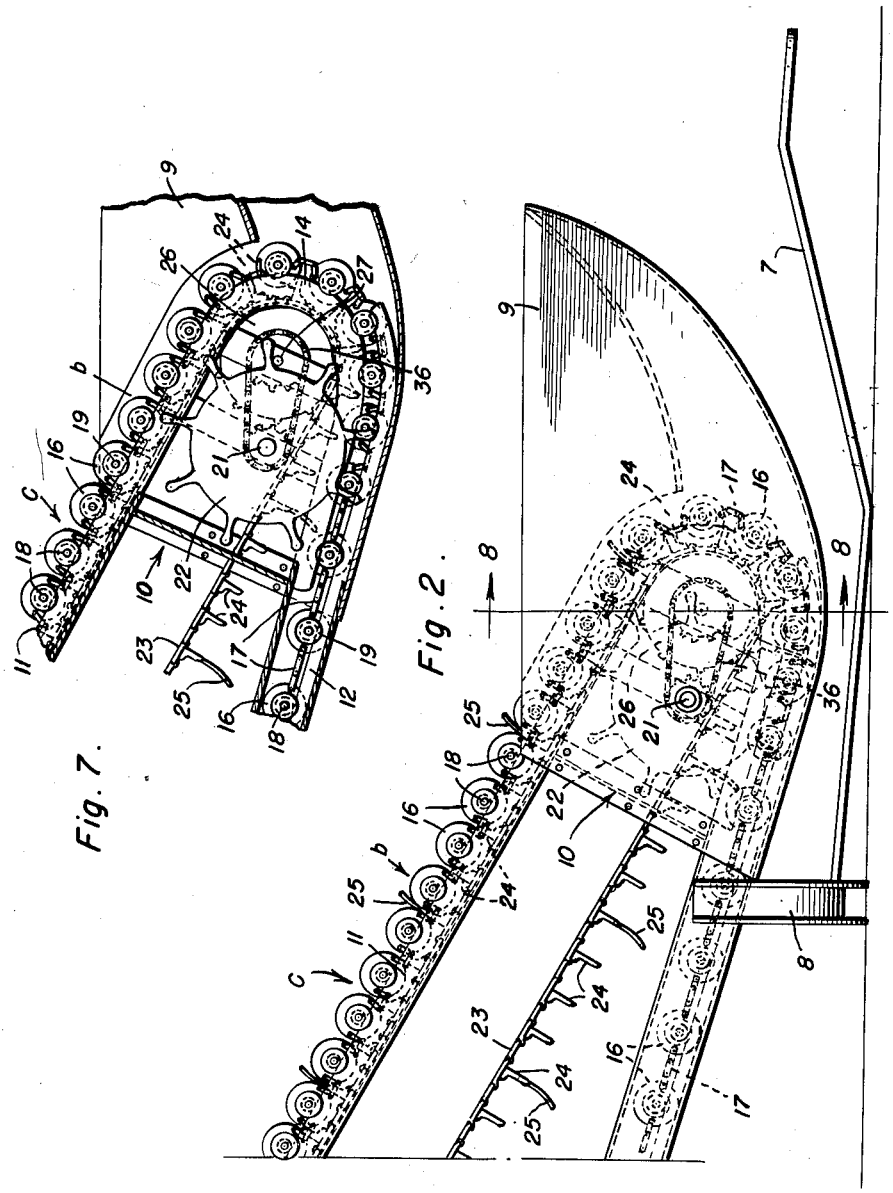
Figure 2 is a side elevational view of the forward portion of the machine.
Figure 3:
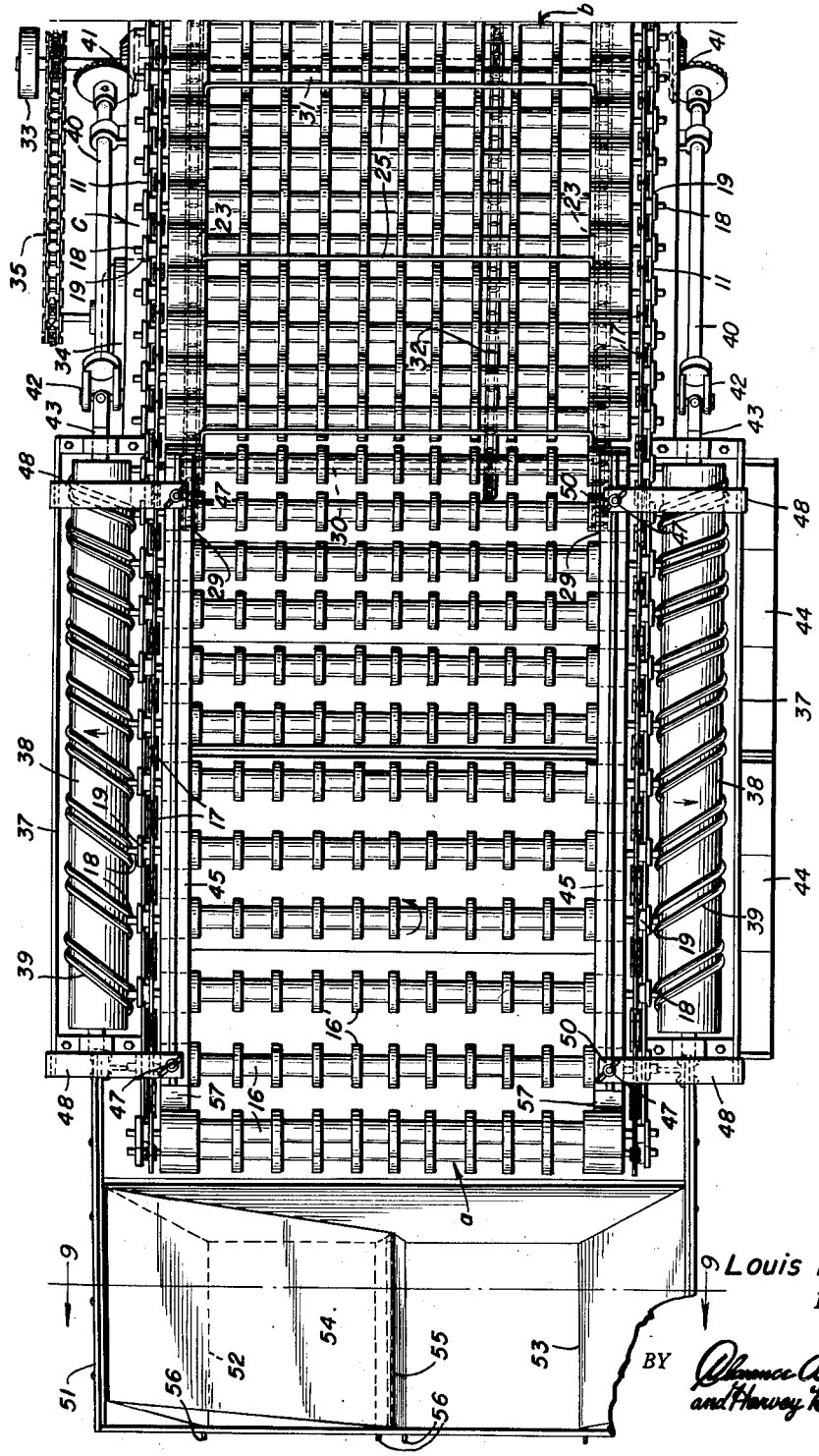
Figure 3 is a top plan view of the portion of the machine shown in Figure 1.
Figure 4:
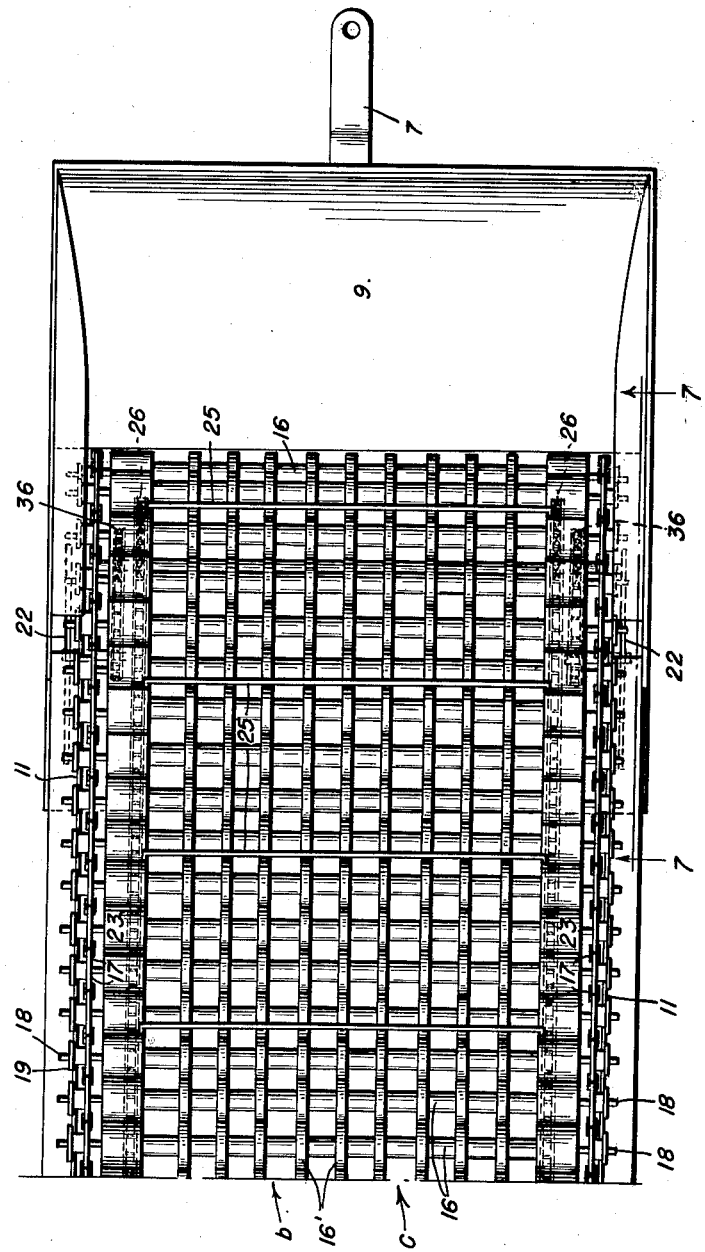
Figure 4 is a top plan view of the portion of the machine shown in Figure 2.
Figure 5:
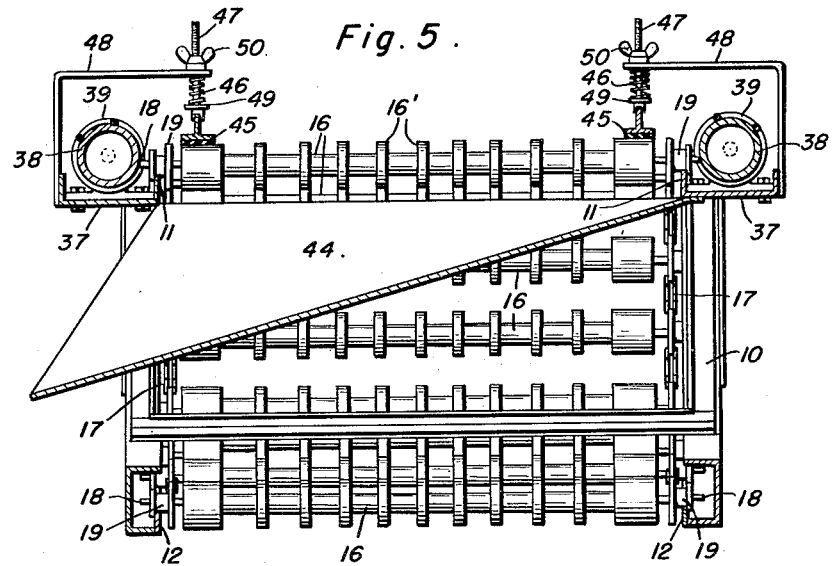
Figure 5 is a transverse section taken on line 5—5 of Figure 1.
Figure 6:
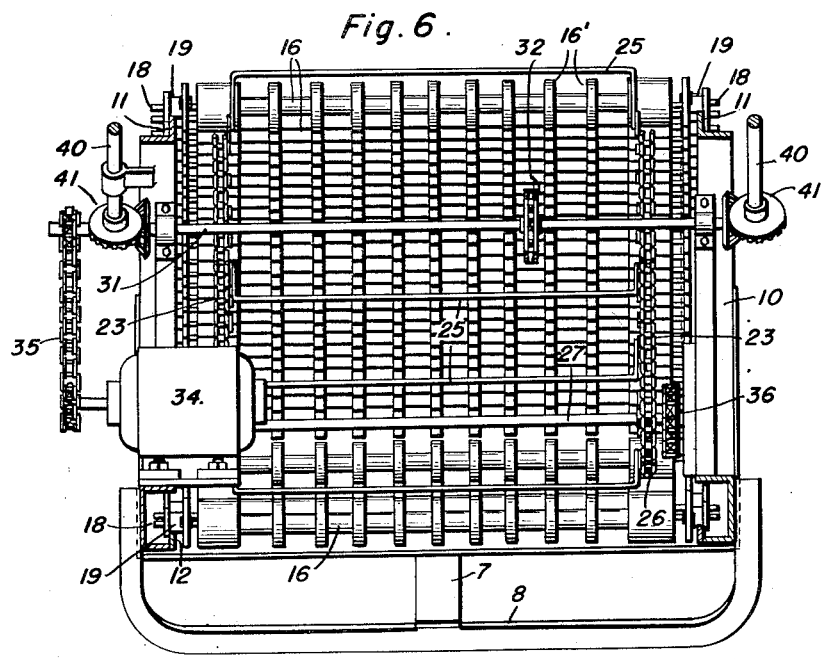
Figure 6 is a transverse section taken on line 6—6 of Figure 1.

Referring in detail to the drawings, C indicates an endless conveyor having a horizontal upper rear portion —a— and a forwardly inclined upper forward portion —b—. This conveyor is mounted near its rear end upon a transverse axle 5 having coaxial ground-engaging wheels 6 journaled on the ends thereof, and it has a rigid front draft tongue 7 adapted to be supported on and connected to the drawbar of a tractor, with the front end of the conveyor in a raised position, when towing the machine from place to place. Near its front end, the conveyor has a prop 8 for supporting that end adjacent but slightly above the ground when the machine is parked and in use. Also, at its front end, the conveyor has a hopper 9 into which the fruits or vegetables may be discharged and by means of which they are fed by gravity to the inclined upper forward portion of said conveyor.

The conveyor has a suitable frame 10 which includes rails 12, the former having extended guide portions curving downwardly and rearwardly at the rear end of the frame, as at 13, and downwardly and forwardly at the front end of the frame, as at 14, and the latter having extended guide portions curving forwardly and upwardly at the forward end of the frame, as at 15. The conveyor also includes an endless conveying and sorting element comprising a series of transverse horizontal rollers 16 flexibly connected by jointed links 17 or the like for limited movement toward and away from each other. The rollers 16 are circumferentially ribbed, as at 16', and have projecting end spindles 18 on which flanged collars 19 are loosely fitted, and the links 17 connect these collars. The collars 19 ride on the guide portions or rails 11 and 12 and have the spindles 18 journaled therein so that the rollers may turn.

Journaled in the sides of frame 10 near the forward end of the latter at 20 are transverse driven stub shafts 21 having star wheels 22 secured thereon in position to engage the spindles 18 of the rollers and force the latter forwardly toward each other into compacted conveying relation as they are about to move upwardly at the front end of the frame.

The endless conveying element is driven by a pair of spaced endless carrier elements comprising endless sprocket chains 23 provided with fingers 24 arranged to engage behind the ends of the successive rollers as the latter are compacted by the star wheels 22, and to move said rollers upwardly and then rearwardly and upwardly at the inclined portion —b— in compacted conveying relation, so as to convey the fruits or vegetables from the hopper 9 to the horizontal portion —a—. At suitable intervals, spaced transversely aligned pairs of the fingers 24 are rigidly connected by transverse bails 25 that project above the rollers and engage behind the fruits and vegetables on the latter to prevent them from rolling forwardly down the inclined portion of the conveyor. The chains 23 pass around sprocket wheels 26 secured on a transverse foot shaft 27 journaled at 28 in the front end of frame 10, and around further sprocket wheels 29 secured on a transverse head shaft 30 which is journaled in the frame 10 directly beneath the juncture of the upper portions —a— and —b— of the conveyor. A transverse counter shaft 31 is journaled in the frame 10 forwardly of the head shaft 30 and is operatively connected to the latter by a sprocket gearing, generally indicated at 32. The counter shaft 31 may carry a pulley 33 for being driven from the power take-off shaft of a tractor, or it may be driven by a motor 34 mounted in the frame, through a sprocket gearing 35. Stub shafts 21 are operatively connected to foot shaft 27 by sprocket gearings 36.

Mounted along the opposite sides of the upper rear portion of the conveyor are channels 37 whose inner flanges form the guide rails 11, and journaled on these channels are longitudinally arranged variable pitch rotary worms 38, each of which has a grooved peripheral thread 39 whose pitch gradually increases from the front end to the rear end of the worm. The end spindles 18 of the rollers 16 are initially engaged in the grooves of the worm threads 39 at the front ends of the worms by the carrier elements 23, 24, whereupon said worms move the rollers 16 rearwardly at the upper rear portion —a— of the conveyor so as to gradually increase the spacing of said rollers to perform a sorting operation as clearly set forth in my prior U. S. Patent No. 2,441,154, dated May 11, 1948. The worms are driven from the counter shaft 31 by longitudinal shafts 40 disposed at opposite sides of the conveyor and geared at their forward ends to the ends of said counter shaft, as at 41, and having their rear ends connected by universal joints 42 to the shafts 43 of the worms. Suitable transverse chutes 44 are mounted beneath the endless conveying and sorting element at the upper rear portion —a— of the conveyor to respectively receive fruits or vegetables of different sizes which pass downwardly between the rollers as their spacing is increased. Suitable means may be provided to hold sacks in position to receive the fruits or vegetables from the respective chutes.

In order to assist the fruits or vegetables in passing downwardly between the rollers, means is provided to cause forward turning of said rollers at the upper rear conveyor portion —a—, or in a forward or counter-clockwise direction as viewed in Figure 1. This means includes longitudinally arranged elongated friction shoes 45 pressed downwardly by springs 46 into engagement with the ends of the rollers at the inner sides of worms 38. The shoes 45 are carried by the lower ends of threaded stems 47 which are slidable through brackets 48 secured on the channels 37, the springs 46 being disposed on said stems between the brackets 48 and abutments 49 secured on the stems below the brackets. Nuts 50 are threaded on the stems 47 above the brackets and cooperate with the latter to adjustably limit downward movement of shoes 45 and regulate the pressure of said shoes against the rollers.

Mounted on and extending across the rear end of the conveyor is a hopper 51 adapted to receive the fruits or vegetables of larger size which do not pass between the rollers. This hopper has two bottom outlets 52 and 53 which are disposed side by side and may be alternately closed by a laterally swingable plate 54 hinged at 55 within and near the bottom of the hopper between said outlets. In either of its positions over one outlet, the plate 54 is inclined toward the other outlet to divert the fruits or vegetables to the latter. Hooks 56 or the like are provided to hold sacks in position to receive the fruits or vegetables passing through the hopper outlets 52 and 53.

Secured on the upper portion of the rear end of frame 10 are short vertical tracks 57 which are arched rearwardly and arranged to have the ends of rollers 16 ride thereon as said rollers start downwardly, thereby causing the rollers to turn rearwardly or in a counter-clockwise direction as viewed in Figure 1. In other words, the tracks 57 cause the rollers to turn in their direction of travel so as to cause the fruits or vegetables to be ejected rearwardly from the rollers into hopper 51.

In operation, the shaft 31 is driven so as to cause the conveying and sorting element to travel rearwardly at the upper flight thereof. With the rollers compacted and the bails 25 projecting above the same, the fruits or vegetables are carried upwardly to the upper rear conveyor portion —a— from the feed hopper 9, whereupon the fingers 24 and bails 25 withdraw from between the rollers and the spindles 18 of the successive rollers successively engage in the grooves of the threads 39 of worms 38 at the forward ends of the latter. The worms then carry the rollers rearwardly and gradually increase the spacing thereof, so that fruits or vegetables of smaller sizes pass between the rollers into the front chute 44, those of larger medium sizes pass into the rear chute 44, and those of largest sizes are discharged into hopper 51.

From the foregoing description, it is believed that the construction, operation and advantages of the present invention will be readily understood and appreciated by those skilled in the art. Modifications and changes in details of construction are contemplated, such as fairly fall within the spirit and scope of the invention as claimed.

Having described the invention, what is claimed as new is:

1. A portable sorting machine in the form of a two-wheeled trailer vehicle and comprising a conveyor mounted near the rear upon a pair of coaxial ground-engaging wheels and having a front draft tongue, means to support the forward end of said conveyor upon and in close proximity to the ground, said conveyor having a forwardly inclined upper forward portion and a substantially horizontal upper rear portion and including a traveling endless conveying and sorting element consisting of a single series of rollers flexibly connected for free movement toward and away from each other, a feed hopper for the conveyor on the front end of the same, power driven means carried by the forward end of the conveyor to engage and move the rollers into compacted conveying relation, power driven means to engage and move the rollers in the compacted relation up the inclined portion, and power driven means to move the rollers rearwardly and gradually increase the space thereof at the upper rear portion, rollers having projecting end spindles, and wherein the means to move the rollers into compacted conveying relation comprises driven rotary star wheels engageable with the spindles of the rollers.

2. A portable sorting machine in the form of a two-wheeled trailer vehicle and comprising a conveyor mounted near the rear upon a pair of coaxial ground-engaging wheels and having a front draft tongue, means to support the forward end of said conveyor upon and in close proximity to the ground, said conveyor having a forwardly inclined upper forward portion and a substantially horizontal upper rear portion and including a traveling endless conveying and sorting element consisting of a single series of rollers flexibly connected for free movement toward and away from each other, a feed hopper for the conveyor on the front end of the same, power driven means carried by the forward end of the conveyor to engage and move the rollers into compacted conveying relation, power driven means to engage and move the rollers in the compacted relation up the inclined portion, and power driven means to move the rollers rearwardly and gradually increase the space thereof at the upper rear portion, means to move the rollers up the inclined portion comprising a pair of endless carrier elements having projecting fingers engageable behind the successive rollers.

3. A portable sorting machine in the form of a two-wheeled trailer vehicle and comprising a conveyor mounted near the rear upon a pair of coaxial ground-engaging wheels and having a front draft tongue, means to support the forward end of said conveyor upon and in close proximity to the ground, said conveyor having a forwardly inclined upper forward portion and a substantially horizontal upper rear portion and including a traveling endless conveying and sorting element consisting of a single series of rollers flexibly connected for free movement toward and away from each other, a feed hopper for the conveyor on the front end of the same, power driven means carried by the forward end of the conveyor to engage and move the rollers into compacted conveying relation, power driven means to engage and move the rollers in the compacted relation up the inclined portion, and power driven means to move the rollers rearwardly and gradually increase the space thereof at the upper rear portion, means to move the rollers up the inclined portion comprising a pair of endless carrier elements having projecting fingers engageable behind the successive rollers, and bails rigidly connecting spaced transversely aligned pairs of said fingers and arranged to project above the rollers to prevent rolling of the objects to be sorted downwardly at the inclined upper forward portion of the conveyor.

LOUIS KERIAN.

REFERENCES CITED

The following references are of record in the file of this patent:

UNITED STATES PATENTS

| Number | Name | Date |
| --- | --- | --- |
| 1,569,038 | Schmechel | Jan. 12, 1926 |
| 1,874,096 | Ghent | Aug. 30, 1932 |
| 2,338,337 | Kerr | Jan. 4, 1944 |
| 2,353,941 | Stebler | July 10, 1944 |
| 2,411,274 | Kerian | Nov. 19, 1946 |
| 2,417,921 | Fox | Mar. 25, 1947 |
| 2,426,953 | Smith | Sept. 2, 1947 |
| 2,447,399 | Dey | Aug. 17, 1948 |

FOREIGN PATENTS

| Number | Country | Date |
| --- | --- | --- |
| 423,149 | Great Britain | Jan. 25, 1935 |